Figure 2:
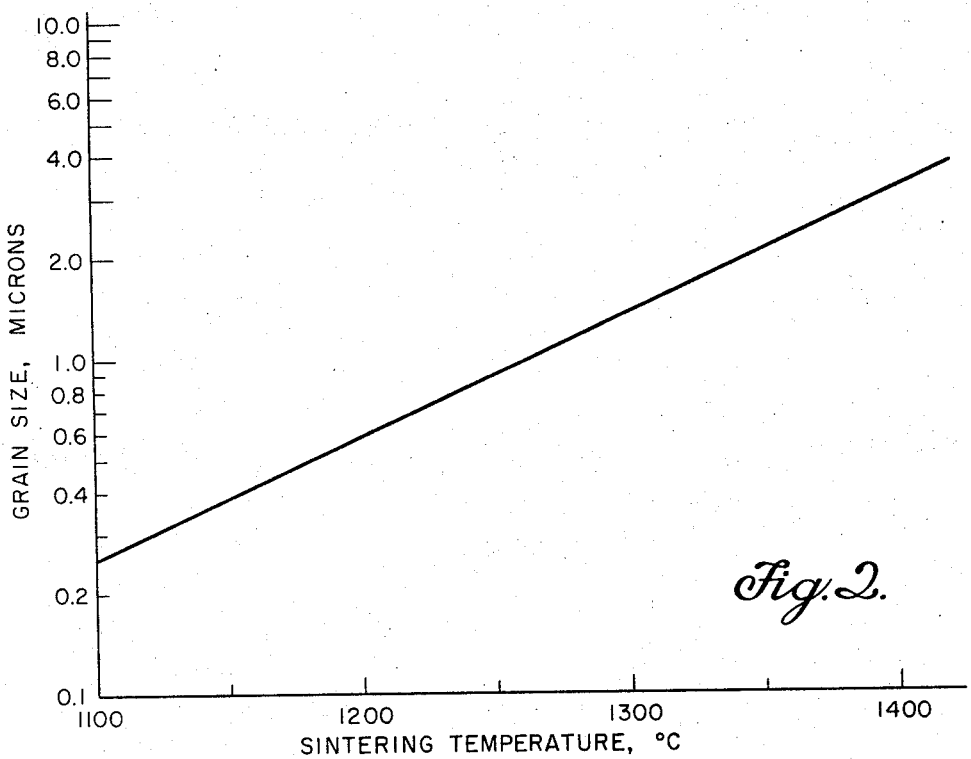

INVENTORS
RONALD C. ROSSI
RICHARD M. FULRATH
BY
ATTORNEY

3,343,915
DENSIFICATION OF REFRACTORY COMPOUNDS

Ronald C. Rossi, Costa Mesa, and Richard M. Fulrath, Berkeley, Calif., assignors to the United States of America as represented by the United States Atomic Energy Commission
Filed Oct. 30, 1964, Ser. No. 407,944
1 Claim. (Cl. 23—141)

This invention relates to refractory materials and more particularly to dense, high strength refractory metal oxides and a process for the manufacture thereof. The process of this invention is applicable to those refractory metal oxides, such as alumina and silica which show an affinity for water.

In the densification of refractory compounds a powder is sintered to a solid under suitable conditions of temperature and pressure, so as to produce a solid having certain properties of density, strength, porosity and grain size. The two basic properties of ceramic materials that are most desirable for strength are low porosity and small grain size. However for a polycrystalline solid that has a relatively large grain size and high porosity, high strength can still be attained by alloying processes which cement the grain boundary of the solid and inhibit excessive grain growth. For example, Comstock, U.S. Patent No. 2,618,567, discloses a pressure molding process for alloying alumina with small amounts of magnesia and cobalt oxide to form such a high strength material. In contrast thereto, the process of the present invention requires no alloying or grain growth inhibiting mechanism. Instead a pure refractory metal oxide is utilized in the pressure sintering to produce an extremely high strength refractory material.

This has been made possible by our discovery that small quantities of adsorbed water on the surface of the metal oxide powder is a major cause of defects in the form of porosity in the solid which has been sintered under pressure and temperature. Such moisture is sometimes picked up from the ambient air, or elsewhere. The porosity of a sintered solid caused by the small quantity of adsorbed water, results in a ceramic material having unnecessarily low strength. Such porosity causes points of stress concentration which easily lead to rupture or failure under stress. By eliminating adsorbed water prior to sintering, the much denser and stronger product is obtained. Thus the process is applicable to those sinterable refractory metal oxides which show an affinity for water.

The present invention produces alumina, for example, as a new polycrystalline composition of matter, which has a transverse strength of 90,000 p.s.i., a grain size less than two microns, and a density greater than 99% of the theoretical density (hereafter referred to as percent T.D.). The transverse strength of 90,000 p.s.i. is very high, such strength having been previously unattainable, except in an alloyed composition.

Basically, the process consists of the removal of the small amounts of adsorbed water from the metal oxide powder by the kinetics of mass action followed by sintering under pressure. The adsorbed water, a polar substance, is removed from the surface of the metal oxide powder by a non-polar solvent. The powder is then fully dried by evaporating the solvent under vacuum and the powder is subsequently sintered to a solid under high temperature and pressure.

Accordingly, an object of this invention is to provide a process for making higher strength refractory metal oxides.

Another object of this invention is to provide a process for producing denser solid bodies of pure refractory metal oxides.

Another object of this invention is to provide a low temperature refractory metal oxide sintering process in which the grain growth is minimized by control of the sintering temperature.

Another object of the invention is to provide a process for sintering refractory metal oxides which requires no grain growth inhibiting alloying elements.

It is still another object of this invention to provide highly pure solid bodies of refractory metal oxide having minimized porosity and grain size and a method for the preparation thereof.

A further object of the invention is to provide as a new composition of matter, aluminum oxide in a form having a density above 99% of theoretical density and a grain size typically of about two microns.

Figure 1:
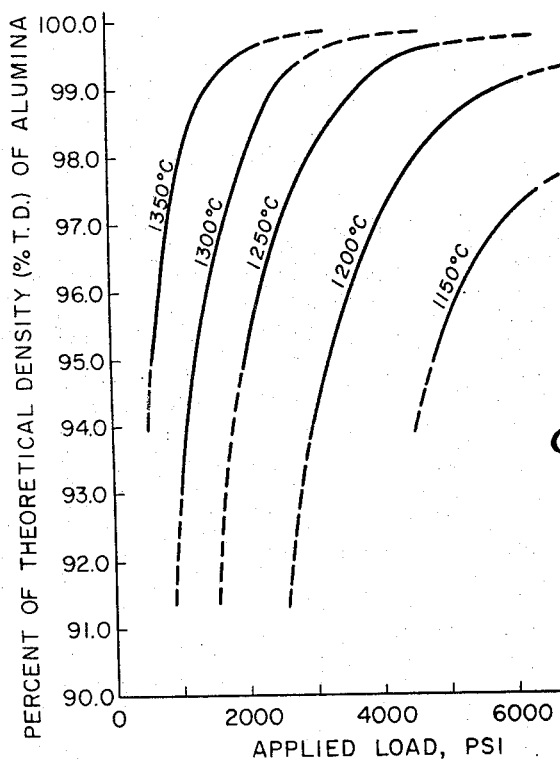

FIGURES 1 and 2 show the results of density and grain size produced by hot-pressing aluminum oxide.

The present invention is applicable to any sinterable refractory metal oxide powder which shows an affinity for water, i.e., is hygroscopic. Generally, this will include many ceramics and most of the refractory metal oxides such as $Al_2O_3$, $SiO_2$, MgO, BeO and $TiO_2$. The exact quantity of water that is adsorbed on the surface of the ceramic powder has not been exactly determined as yet, but is estimated to be several mono-molecular layers in thickness. Some of adsorbed water can be driven off by heating at high tempertaure, however a small quantity of the first mono-molecular layer will remain. A solid product formed from ceramic powder containing this small amount of water will exhibit "bloating" and increased void spaces at the grain boundary when the product is heated.

To reduce or eliminate the porosity according to the present invention requires the removal of the small amounts of water adsorbed on the metal oxide. The water, a polar liquid, is replaced by mass action from the ceramic powder by a liquid non-polar solvent. Such solvents include, but are not necessarily limited to, acetone, 2-propanol, 1-propanol and butanol. It has been determined experimentally that methanol and ethanol, both polar liquids, will not function for this purpose. A further property of the non-polar solvent is that it must dissolve any water thus desorbed from the ceramic powder.

The invention also has the advantage of operating at a low sintering temperature, which prevents excessive grain growth in the polycrystalline solid. Grain growth is the process by which the average grain size of strain-free material increases continuously during heat treatment without change in the grain size distribution. The driving force for grain growth is the difference in energy between the finer grained material and the coarser grain sizes resulting from the decrease in grain boundary area and total boundary area. From theoretical considerations, grain growth should vary as the square root of time. Experimentally it is found that the growth rate is slower than that predicated. One reason for the slower rate is that inclusions inhibit grain growth. Either particles of an alloyed second phase or pores can act as a grain growth inhibiting inclusion. For example when alumina is sintered at temperatures above 1600° C. the grain size increases rapidly. In this invention the alumina grain size can be maintained at less than two microns quite readily when sintering at temperatures in the range from 1150° C. to 1350° C. Thus, the alumina grain growth is not a difficult problem as the sintering is performed at lower temperatures than have heretofore been utilized. Because of the low sintering temperature, no grain growth inhibiting inclusions are required in this invention and a pure product may be produced.

The structure and operation of suitable hot press apparatus for performing the sintering are well understood in the art and therefore only a brief description will be given here. E. W. Hoyt, Vacuum Hot Pressing of Refractory Materials, 1961 Transactions of Eighth National Vacuum Symposium, published by Pergamon Press, 1962, gives a description of typical apparatus that can be used in the pressure molding step of this invention.

A suitable die assembly which has been employed to practice the invention consisted of a graphite die cylinder with a hollow bore in which a plunger is fitted to compress the powdered samples. The graphite die is encased with a molybdenum resistance coil which heats the assembly to the sintering temperature of the ceramic powder. The resistance coil is energized by A.C. power at 220 volts. The temperature of the ceramic sample inside the die was measured with a Pt-Rh thermocouple, calibrated to an accuracy of $\pm 5°$ C. The graphite plunger, which is fitted into the hollow bore of the die to compress the powder, is connected to a hydraulic cylinder which applies pressures of up to 10,000 p.s.i. The applied pressure is determined from the hydraulic fluid pressure and is measured with an external pressure gauge. The whole assembly is encased in a sealed vacuum chamber to permit pressure sintering under vacuum conditions.

held constant for the duration of the run. The runs were made for five hours during which the displacement of the compact was continuously recorded. At the conclusion of the run, the power to the resistance coil was shut off and the compact was cooled rapidly and subsequently removed from the die.

The density of the alumina compact was measured by well understood displacement techniques, using ethanol on an analytical balance. The balance is zero-adjusted with the specimen holder suspended in the ethanol. A single crystal of corundum (sapphire), i.e., pure $Al_2O_3$, is first weighed in air and then in ethanol. The sintered polycrystalline compact is weighed in air and next in ethanol. The percent T.D. of each of severeal sintered alumina compacts prepared according to the process have been calculated from these values and are listed in the table. The alumina grain size in microns is measured on electron micrographs by the linear transverse method and is listed in the table in parentheses adjacent to the corresponding percent T.D.

TABLE

| Load, p.s.i.: | Temp., ° C. | | | | |
|---|---|---|---|---|---|
| | 1,150 | 1,200 | 1,250 | 1,300 | 1,350 |
| 1,000 | -------- | -------- | -------- | 93.10 | -------- |
| 2,000 | -------- | -------- | 95.02 (0.94) | 97.75 (1.38) | 99.55 (2.06) |
| 2,500 | -------- | -------- | 97.19 (0.85) | 98.68 (1.31) | -------- |
| 3,000 | -------- | 94.07 (0.58) | 97.90 (0.95) | 99.48 (1.35) | -------- |
| 3,500 | -------- | -------- | -------- | 99.74 (1.27) | -------- |
| 4,000 | -------- | 96.96 (0.59) | 99.33 (0.89) | 99.76 | -------- |
| 5,000 | -------- | 98.43 (0.58) | 99.67 (0.85) | -------- | -------- |
| 6,000 | 97.13 (0.40) | 99.07 (0.55) | -------- | -------- | -------- |

As a specific example of the process, the invention has been practiced in accordance with the following steps.

Alumina, $Al_2O_3$, in powdered form having an untamped density of 0.64 grams per cm.$^3$, a certified purity of 99.997% and an approximate particle size of 0.3 micron was used in the sintering process. Thus the alumina powder was basically pure and had no significant contaminants. Approximately 10 grams of the powder were weighed into a beaker in which 20 ml. of 2-propanol was added and mixed with the powder. The beaker containing the mixture was placed in the air-lock of a glove-box which was then evacuated at ambient temperature for two days during which time the alcohol evaporated and the powder became desiccated. The beaker containing the powder was then transferred into the glove-box which had a dry helium atmosphere and which contained the graphite die assembly. The alumina powder was loaded into the previously described graphite die, which had a one inch inside diameter and upon which a colloidal graphite suspension such as "Aquadag" had been previously applied as a die-wall lubricant. The loaded die was removed from the glove-box and manually cold pressed under a load of 2000 p.s.i. The cold pressing was performed in ambient air as rapidly as possible to minimize contamination of the alumina with moisture in the air. The die was then loaded into the hot-press and was immediately evacuated and maintained under a vacuum of about $5 \times 10^{-5}$ mm. Hg for a period of up to two days before the final densification run was made.

The temperature of the die was increased at a rate of 12° C. per minute to 800° C., maintained at 800° C. for 15 minutes, and subsequently increased at a rate of 100° C. per minute to the final temperature. Full pressure was applied to the alumina compact at 800° C. and was Theoretical density (T.D.) of the corundum single crystal is taken as 3.987 gm./cc., the generally accepted density. The percent T.D.'s shown in Table A are plotted in graphical form on the attached drawing, FIGURE 1. The percent T.D. attained for the sintered alumina samples is plotted as a function of the applied sintering pressure, with the sintering temperature as a controlling parameter. As can be seen from FIGURE 1, a theoretical density above 99% is attained very readily at sintering pressures less than about 6000 p.s.i., and at a temperature from about 1200° C. to about 1350° C. It is also apparent that sintering pressures greater than 6000 p.s.i. and a temperature less than 1200° C., can be utilized to attain an alumina solid of 99% T.D. However, such low temperatures require higher pressures which are more difficult to provide in a graphite die. Referring to the 1150° C. curve, it is estimated a pressure in excess of 10,000 p.s.i. is required to attain 99% T.D.

However, as previously stated, it is desirable to use a low sintering temperature to prevent excessive grain growth and thus the optimum operating conditions will frequently depend on the pressure capability of the available dies.

Referring to FIGURE 2, there is shown a log plot of the alumina grain size as a function of the sintering temperature with the points falling on a straight line. As can be seen from the graph, a grain size of less than two microns is readily obtained at sintering temperatures of less than 1350° C.

Utilizing the same apparatus and handling techniques as described previously, but substituting magnesium oxide powder of Baker Analytical Grade having grain size of less than 1 micron and 99.8% purity, the resulting sintered solid had a density of 99.6% of the theoretical density, and a grain size of 30 microns. The magnesium oxide powder was washed with 2-propanol as in the alumina sintering process. The magnesia was sintered for a period of two hours at a temperature of 1200° C. and a pressure of 5000 p.s.i., which yielded the solid polycrystalline MgO of 99.6% of theoretical density.

While the invention has been described with reference to particular examples it will be apparent to those skilled in the art of ceramics and refractories that the process is applicable to a wide variety of sinterable ceramics. Thus, many modifications are possible within the spirit and scope of the invention and it is not intended to limit the invention except as defined in the following claim.

What is claimed is:

A process for producing a solid refractory metal oxide having a density of about 99% of theoretical selected from the group consisting of the oxides of aluminum, magnesium, silicon, beryllium, and titanium, comprising immersing finely divided powder of said oxide in a nonpolar liquid solvent selected from the group consisting of acetone, 1-propanol, 2-propanol and 2-butanol, drying said powder by evaporation of said solvent, and pressure sintering said powder under vacuum at a temperature in the range from about 1200° C. to about 1350° C. and at a pressure up to about 6000 p.s.i.

References Cited

UNITED STATES PATENTS

| | | | |
|---|---|---|---|
| 2,091,569 | 8/1937 | Ridgway et al. | 264—332 |
| 2,427,454 | 9/1947 | Heany | 106—62 X |
| 2,538,959 | 1/1951 | Ballard. | |
| 2,618,567 | 11/1952 | Comstock | 106—65 X |
| 3,025,137 | 3/1962 | Murray et al. | 23—183 |
| 3,026,210 | 3/1962 | Coble | 106—65 X |
| 3,093,498 | 6/1963 | Whittemore et al. | 106—65 X |
| 3,116,137 | 12/1963 | Vasilos et al. | 23—182 X |
| 3,141,782 | 7/1964 | Livey et al. | 106—55 |
| 3,141,786 | 7/1964 | Bugosh | 106—65 X |
| 3,226,456 | 12/1965 | Ryshkewitch et al. | 106—58 X |
| 3,236,595 | 2/1966 | Carnall et al. | 23—201 |
| 3,311,482 | 3/1967 | Klinger et al. | 106—65 |

OSCAR R. VERTIZ, *Primary Examiner.*

G. T. OZAKI, *Assistant Examiner.*